United States Patent [19]

Hetherington et al.

[11] 4,236,305

[45] Dec. 2, 1980

[54] APPARATUS FOR FITTING A RESILIENT RING ON A BOTTLE

[75] Inventors: Ross W. Hetherington, Heathcote; Kenneth J. Armstrong, Bexley; Leonard Ireland, Mullaloo; John Canty, Kareela; Ernest R. Banfield, Peakhurst, all of Australia

[73] Assignee: Abbott Laboratories, North Chicago, Ill.

[21] Appl. No.: 900,533

[22] Filed: Apr. 26, 1978

[51] Int. Cl.$^3$ .............................................. B23P 21/00
[52] U.S. Cl. ..................................... 29/774; 29/235; 29/450; 29/453; 215/101
[58] Field of Search .................. 29/717, 718, 774, 235, 29/450, 453; 215/101

[56] References Cited

U.S. PATENT DOCUMENTS

| | | | |
|---|---|---|---|
| 2,835,963 | 5/1958 | Drennan et al. | 29/714 |
| 3,036,371 | 5/1962 | Gray et al. | 29/235 |
| 3,067,501 | 12/1962 | Baumann et al. | 29/235 |
| 3,238,609 | 3/1966 | Nichols | 29/235 |
| 3,462,823 | 8/1969 | Heisler | 29/717 |

Primary Examiner—Charlie T. Moon

Attorney, Agent, or Firm—Robert L. Niblack; Aaron L. Hardt; Robert S. Beiser

[57] ABSTRACT

A resilient ring is fitted over a shoulder and onto the bail band indent of a bottle by an apparatus having means for supporting and locating the resilient ring, means to locate and align the bottle with the ring, and ram means for relatively displacing the ring and bottle to force the ring over the shoulder of the bottle, the ring support means engaging the shoulder of the bottle under radially inwardly directed biassing forces while supporting the ring as it is deformed to pass over the shoulder means. Preferably, the support means has a multiplicity of circumferentially spaced jaw elements displaceable under spring biassing in respective guides. In another aspect, an important application of the invention is to a ring member for supporting an intravenous injection solution bottle in an inverted suspended mode, the ring member having an annular cylindrically shaped band integrally formed of plastics material with a flexible hoop connected at respective ends to the exterior side of the band at locations on generally opposite sides of the band and being flexibly displaceable to a working position in which the hoop member extends over the bottom of the inverted bottle.

6 Claims, 5 Drawing Figures

APPARATUS FOR FITTING A RESILIENT RING ON A BOTTLE

FIELD OF THE INVENTION

The present invention is concerned with a method and apparatus for fitting an annular ring device onto objects such as bottles having a shoulder and a bail band indent for receiving the ring device. Furthermore the invention is found, in one particular application, in an annular ring member to be fitted onto a bottle such as a medical saline solution bottle which is to be suspended in an inverted mode when in use.

BACKGROUND OF THE INVENTION

The need has been identified for a cheap, reliable and convenient device for articles such as bottles whereby the article can be suspended for use. One specific example of such a requirement has been found with glass bottles which are used for containing medical intravenous injection fluids. Such bottles have at one end an opening which after filling is sealed before the whole product is autoclaved so as to be sterile. The bottle has a curved corner extending from its bottom to the side wall, a bail band indent closely spaced from the bottom of the bottle being provided for receiving a suspension band with a shoulder between the bail band indent and the bottom of the bottle acting to retain the band position. When in use the bottle can be suspended in an inverted mode by the suspension band to provide drip feed of the contents to a patient.

Hitherto, such intravenous solution bottles have been suspended by a metal suspension unit having a wire hoop pivotally connected to a metal band at opposite sides of the bottle. The metal band is formed from plated strip which is manually fitted onto the bail band indent of the bottle by threading one end of the strip through an aperture in the opposite end of the band and bending the strip back on itself. Not only have such bands been expensive to fit in terms of labour component but furthermore particularly since unskilled labour is used there is a significant risk of the band being inadequately tight, and which could cause the band to slip when in use and the glass bottle could be dropped with serious consequences.

There is therefore a need for an economic and effective replacement for the known metal bands and in one aspect of the invention there is proposed such a replacement.

SUMMARY OF THE INVENTION

The invention is directed to an apparatus and method for applying a resilient ring (such as that produced by the first aspect of the invention) to the neck of a bottle although other applications of the invented apparatus and method will be a readily apparent when considering analogous problems. The invention also extends to a resilient ring for fitting on bottles which are to be suspended.

In a first aspect of the invention, there is provided a ring member for engaging on and permitting suspension of a rigid bottle, the bottle having a bail band neck separated from one end thereof by shoulder means; the ring member comprises an integrally moulded plastics body having an annular band of cylindrical shape with an axial length substantially greater than the wall thickness of the band and a flexible hoop member connected at respective ends to the exterior of the band at locations on generally opposite sides. The hoop member is adapted to be flexed in use so as to extend in an arc across the adjacent end of the bottle.

Such a ring member, which hereinafter will be referred to as a bail, can be economically moulded with the hoop member extending around the outside of the band and thus in the same general plane of the band in a single moulding operation using any convenient plastics material such as polyethylene. Excellent quality control within the prescribed tolerances can readily be obtained and the bail can be very cheap to produce. Furthermore by using the arrangements described hereinafter the bail can be fitted to a bottle extremely efficiently and cheaply compared with prior art methods.

By using a standard 20" drop test, it has been demonstrated that a much greater strength reliability can be achieved thus providing greater safety in ultimate use, and in addition the invention permits the elimination of sharp and potentially dangerous edges to the bail and obviates the risk of insecure application of the bail to the bottle.

In other aspects, the present invention extends more generally to the fitting of any resilient ring to an object such as a bottle having a bail band indent separated from the end of the bottle by a shoulder arrangement.

In another aspect of the invention there is provided an apparatus for fitting a resilient ring over the shoulder of a bottle and onto a bail band indent thereof, the apparatus comprising:

(a) support means for supporting and locating the resilient ring ready for fitting onto the bottle, (b) locating means for receiving and locating the bottle in juxtaposition to the ring whereby the ring is substantially aligned with the shoulder means, (c) ram means for press fitting the ring over the shoulder means by relative displacement of the bottle and the support means with the ring thereon, and (d) the support means being formed and positioned for engaging the shoulder means of the bottle under radially inwardly directed biasing force while the support means supports the ring as it is deformed to pass over the shoulder means and onto the bail band indent.

Although the form of the support means may vary, an important and preferred embodiment consists in the support means comprising a multiplicity of jaw elements, each having a nose adapted to engage and slide over the shoulder means of the bottle.

The mode of biasing the elements is preferably to provide a mounting structure having guide means extending radially with respect to the axis which will coincide with the axis of the bottle, with helical compression springs urging the jaw elements radially inwardly.

In preferred embodiments of the invention a displaceable platform is provided for receiving the bottle, the platform extending above the height of the support means and thus acting as a spigot over which the resilient rings are adapted to be dropped; the platform is arranged to be depressed relative to the support means which initially are biased inwardly to abut the periphery of the platform and slide axially therealong during operation of the ram means before engaging the shoulder means of the bottle.

In a preferred embodiment of the invention, which is for use with a bottle of circular cross-shape having a smoothly curved corner at the junction of the side and bottom walls with a shoulder provided between the bottom wall and a bail band indent formed in the side wall of the bottle, the platform has a circular shape corresponding to the bottle.

The ram means can take any convenient form but in a preferred embodiment the ram is a pneumatically operated ram having a cup shaped head adapted to engage around the upper end of the bottle to force the bottle down between the support means.

In order to ensure positive ejection of the bottle after fitting of the resilient ring a second ram is preferably provided in the base portion of the apparatus.

Although the invention may be embodied in arrangements having a single station with manual feed of both bottles and resilient rings, greater production economies can be achieved by a more automatic form of the invention. However, it is still preferred that there is manual feed of the resilient rings onto the support means but supply of bottles can be effected automatically. A further inventive feature proposed for the apparatus is the provision of a turntable having a multiplicity of circumferentially spaced locations having respective support means at each station, with drive means for intermittently rotating the turntable in synchronisation with a bottle feed; the bottle feed comprises a support bed over which the bottles can move, guides, and a counter rotating carrier adapted to cooperate in partially overlapping relationship with the turntable to supply each bottle in turn to a pressing station at which the turntable and carrier overlap; a pneumatic ram at the pressing station engages the bottle and depresses it to receive the resilient ring.

Preferably the apparatus includes indexing means to sense the orientation of the bottle, and to rotate the bottle around its axis if necessary to the desired orientation. This permits the bottle and its associated label to be orientated in the correct way to suit the resilient ring.

In another aspect, the invention is directed to a method of fitting a resilient ring member over shoulder means onto a bail band indent of a bottle, the method comprising:

(a) locating the ring member over a bottle receiving table and dropping the ring member onto support means extending around the table,
(b) positioning a bottle on the table,
(c) pressing the bottle downwardly on the table thereby forcing the ring member over the shoulder means onto the bail band indent, the support means being biassed inwardly to engage in sequence the table, the leading edge portion of the bottle and the shoulder means; and,
(d) raising the bottle and table above the support means for discharge of the bottle.

BRIEF DESCRIPTION OF THE DRAWINGS

The various aspects of the invention will now be described further but by way of example only with reference to the accompanying drawings of which.

DETAILED DESCRIPTION OF PREFERRED EMBODIMENTS

Figure 1:
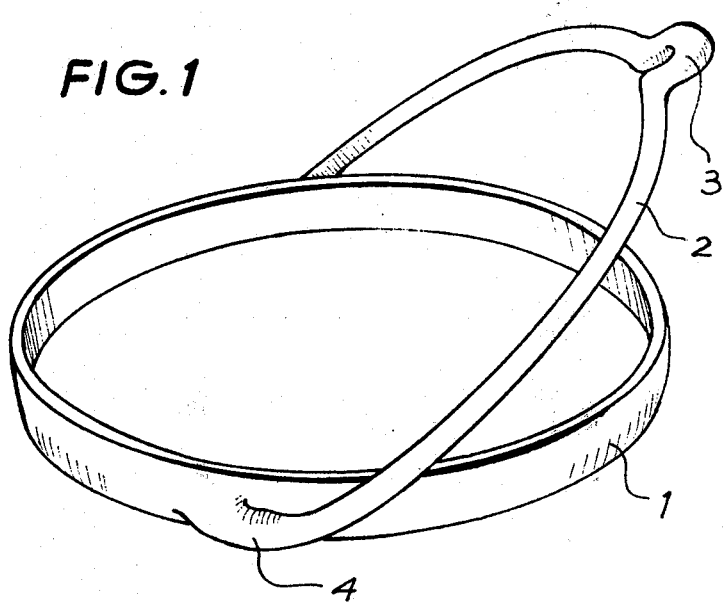
FIG. 1 is a respective view of a resilient ring in the form of a plastic bale for application to an intravenous solution bottle.

Referring first to FIG. 1, the plastic bail comprises an annular band 1 of greater axial length than wall thickness integrally formed with a flexible loop member 2 which extends between opposite sides of the band and provides a hanging eye 3 whereby a bottle may be suspended. The ends of the loop member are attached to the band at locations approximately 210° apart and the end portions of the loop member are of thicker cross-section which reduces in the direction towards the eye 3. The arrangement is such that the hanging loop when flexed so that its plane is generally at right angles to the plane of the band intersects with the axis of the band and thus the bottle.

Figure 2:
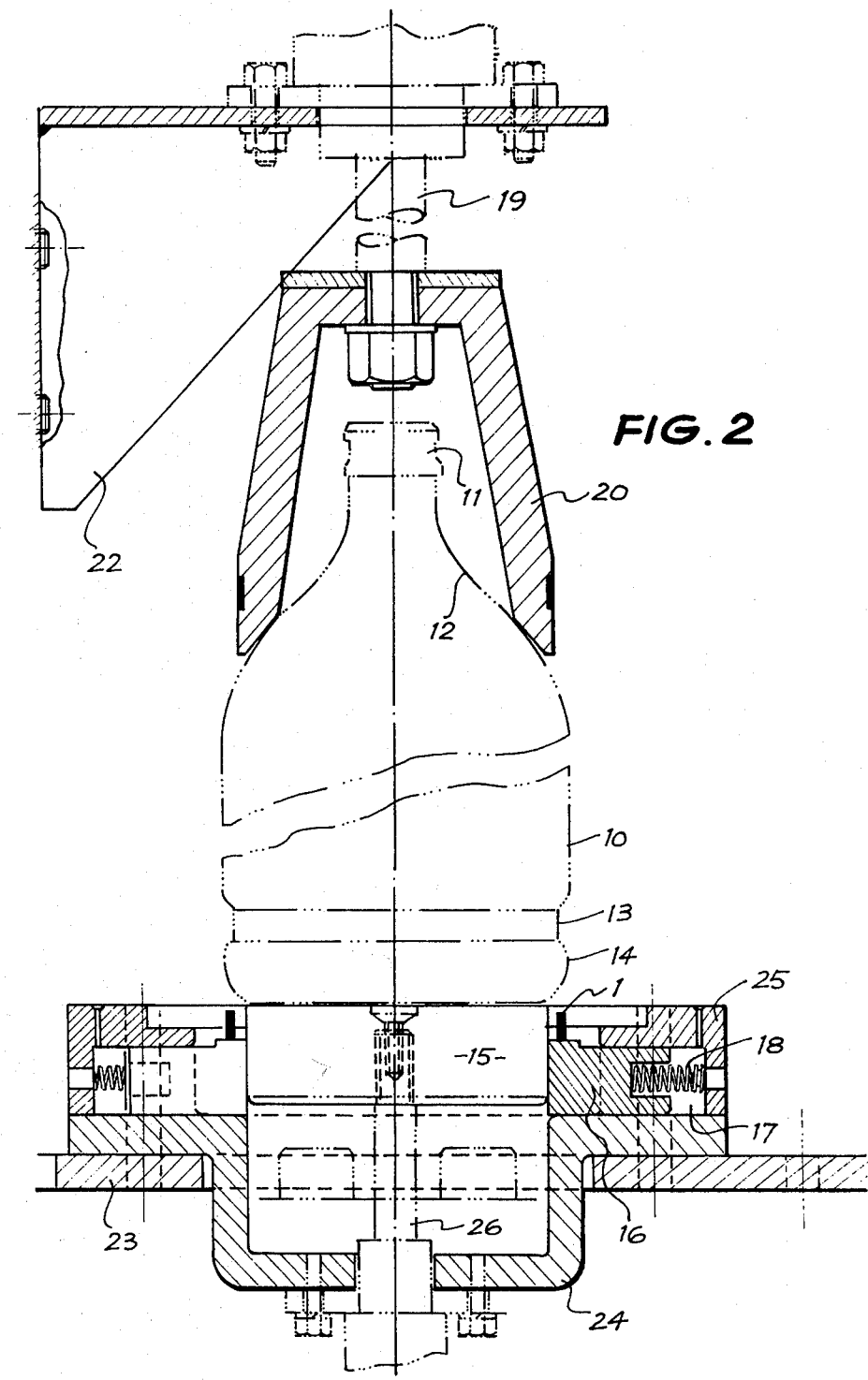
FIG. 2 is a cross-sectional view taken along the line A—A of FIG. 3 and illustrating a first embodiment of apparatus for applying the plastic bale to a bottle.
Figure 3:
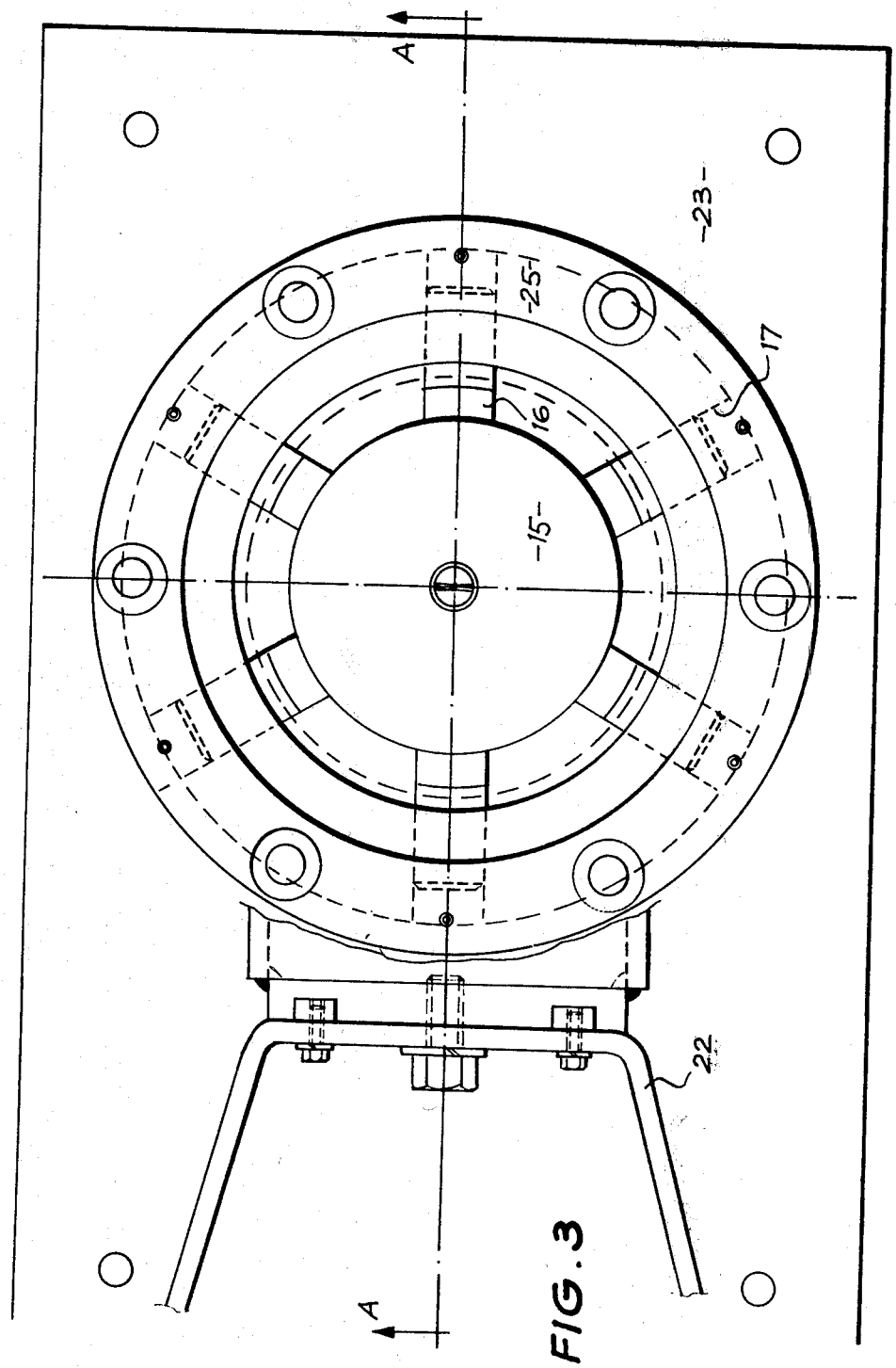
FIG. 3 is a plan view of the arrangement of FIG. 2 with the upper ram removed for clarity.

Referring now to FIGS. 2 and 3, a one liter glass bottle 10 has a closure cap 11 and a sloping shoulder 12 at the upper end and near the lower end has a bail band indent 13 separated from the bottom by a shoulder 14 which is smoothly curved. The apparatus is arranged to fit the bail of FIG. 1 onto the bail band indent 13 and comprises a circular nylon support table 15 biased upwardly to the position shown in FIG. 2, with support means for the plastic bail 1 in the form of six jaw elements 16 spaced uniformly around the apparatus, each element being a block of nylon mounted for radial displacement in a respective guide aperture 17, against the biassing of a helical compression spring 18.

The bottle is forced downwardly by a pneumatic ram operating on a vertical shaft 19 at the bottom of which a conical cap 20 is provided for engaging the sloping shoulders 12 of the bottle and avoiding contact with the cap 11 which, being a sterile closure, must remain undamaged. This equipment is mounted on a rigid framework 22 which is secured to a mild steel bed plate 23. The bed plate 23 also supports a flanged mounting dish 24 onto which an annular cover cap 25 is screwed to define therebetween the guide aperture 17 in which each jaw element 16 is mounted.

In operation, the plastic bale 1 is dropped into position on the six spaced jaw elements 16 with the table 15 projecting above the jaw elements and thus providing a spigot for location of the bail. As the bottle and table 15 are depressed the jaw elements slide over the periphery of the table as the upper end of the plastic bale engages the curved shoulder 14 of the bottle. The plastic bale is thus progressively expanded with the jaw elements subsequently also coming into contact with the curved corner of the shoulder 14, and moving outwardly against the biassing force.

The pneumatic ram stops when the plastic bale has snapped into the bail band indent area 13 at which point the table 15 has been depressed to the position shown in chain-dotted lines in FIG. 2.

Figure 4:
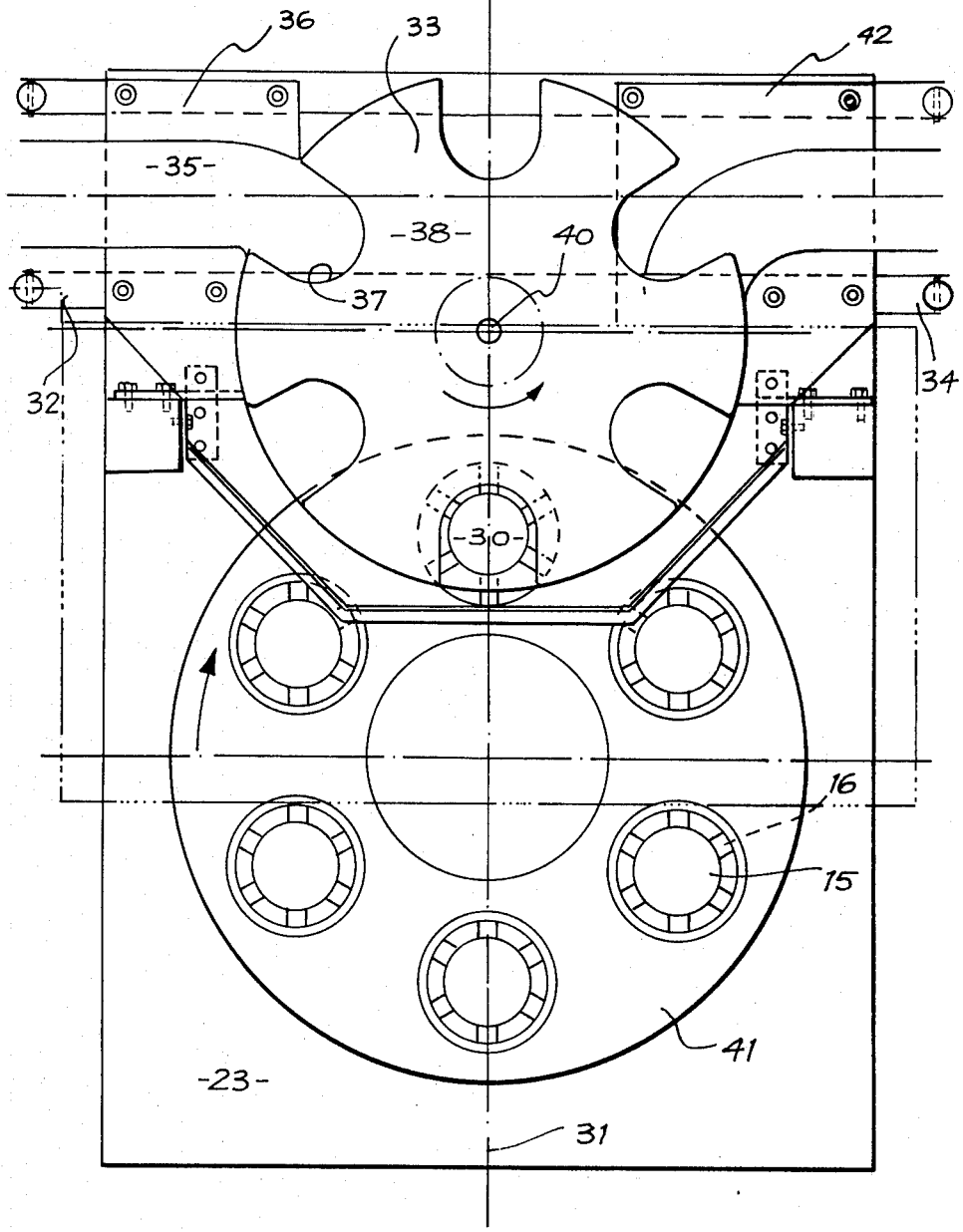
FIG. 4 is a plan illustrating a production line application of the arrangement of FIGS. 2 and 3.
Figure 5:
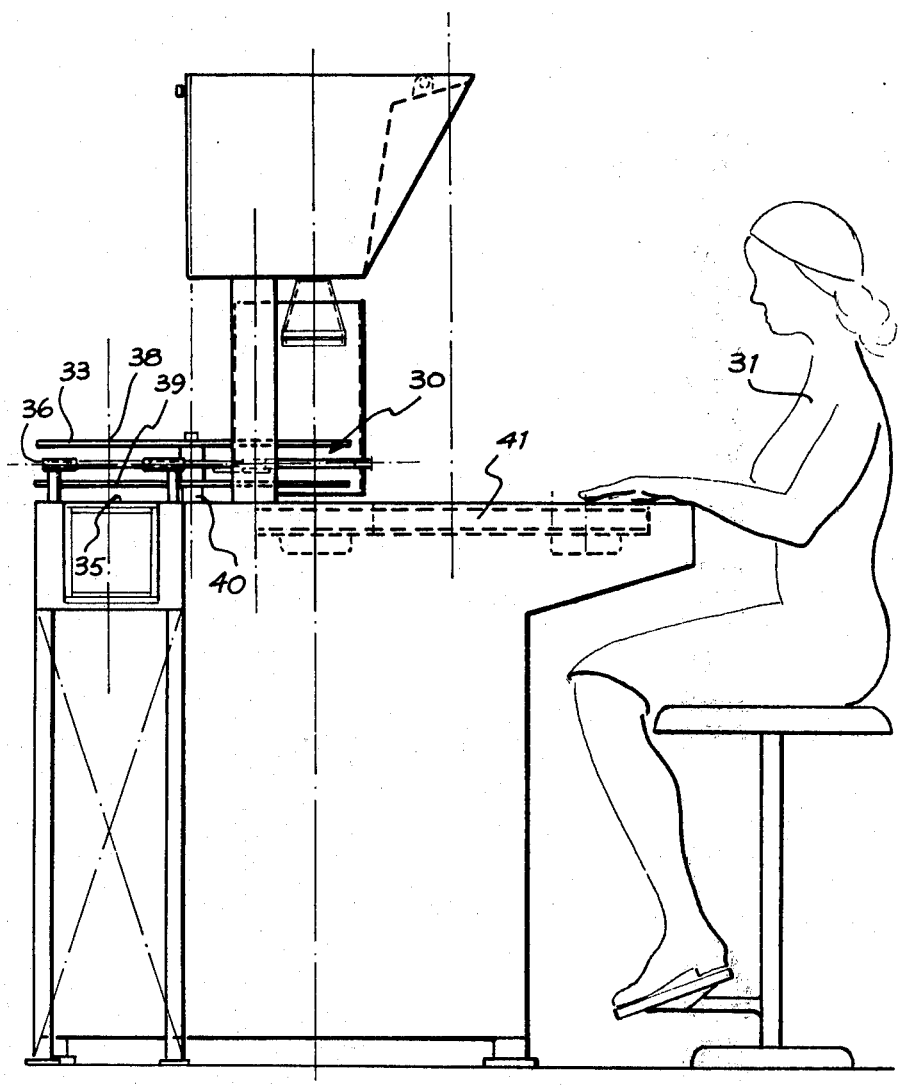
FIG. 5 is a side elevation of the unit of FIG. 4.

The table 15 is mounted on a metal shaft 26 which is biased upwardly by a spring which is not shown in the drawing. Furthermore a second pneumatic ram is connected to the shaft 26 so that after the upper ram has been retracted, the bottle 10 and table 15 are positively displaced upwardly to the initial position shown in FIG. 2. Referring now to FIG. 4, a production line is illustrated having a plastic bail fitting station 30 substantially in accordance with that described above with reference to FIGS. 2 and 3. The production line is arranged for manual feed of plastic bails by an operator 31 indicated in FIG. 5 and automatic feed of bottles by a bottle supply conveyor 32, a rotatable circular carrier 33 and a take away conveyor 34. The conveyor 32 guides the bottle so that they are slid across a plastic support surface 35 of low friction characteristic through guides 36 to be received in a U-shaped receiving location 37 of the carrier 33. A step-wise drive is provided for intermittently rotating the carrier with the bottle taken up in the receiving recess 37. As shown in FIG. 5 the carrier 33 is formed from a pair of spaced parallel circular discs 38 and 39 mounted on a shaft 40.

The supply of plastic bails is effected by a turntable 41 having six spaced receiving stations, each having a respective set of jaw elements 16 and a bottle support table 15 of the form shown in FIGS. 2 and 3. As is plain from FIG. 4 a number of such stations are always available to the operator 31 for receiving plastic bales. The turntable 41 is driven in synchronisation with the carrier 33, the top of each table 15 when in the raised position being at the same level as the top of the plastic sheet 35. When a bottle is positioned at the station 30, the pneumatic ram is operated to force the bottle downwardly onto the bail and then retracted, a second ram not shown in the drawing forcing the table and bottle up again so that the carrier and turntable 41 can move through a further step and take away the bottle fitted with its bail. After a further sequence of operations the bottle is passed through guides 42 onto the take-away conveyor 34.

We claim:

1. Apparatus for fitting a resilient ring over shoulder means of a bottle and onto a bail band indent thereof, the apparatus comprising:
   (a) support means for supporting the resilient ring in a fitting position,
   (b) locating means for receiving and locating the resilient ring and the bottle in axially aligned juxtaposition to each other,
   (c) ram means for press fitting the ring over the shoulder means by relative displacement of the bottle and the support means with the ring thereon,
   (d) the support means having biasing means for radially inwardly biasing the support means and the support means being formed and positioned for engaging the shoulder means of the bottle under the biasing of the biasing means while the support means supports the ring as it is deformed to pass over the shoulder means and onto the bail band indent,
   (e) said locating means comprising a displaceable circular platform for supporting the bottle and normally extending upwardly within and above the support means, the ram means being operable to engage the bottle at a location remote from its shoulder for displacing the bottle downwardly while supported on the downwardly displaceable platform.

2. Apparatus as claimed in claim 1 and further comprising a second ram operable after operation of said first mentioned ram means for returning the platform to the initial position.

3. Apparatus as claimed in claim 1 and comprising an automatic bottle supply conveyor, carrier means for advancing bottles in sequence from the supply conveyor to said locating means and for discharging the bottles in sequence from the locating means after the fitting of the resilient ring thereto, and a takeaway conveyor for removing the discharged bottles.

4. Apparatus as claimed in claim 3, wherein the carrier means comprises a rotatable turntable having stepwise rotatable means connected thereto and having spaced receiving stations therearound and adapted to bring the receiving stations in turn into alignment with the ram means and the bottle supplied by the supply conveyor, each receiving station having its own support means and locating means.

5. Apparatus as claimed in claim 3, wherein the carrier means comprises rotatable apertured disc means and a fixed plastic support sheet over which the bottles are slid when engaged by the disc.

6. The apparatus as described in claim 4 wherein the carrier means comprises rotatable apertured disc means adapted to be driven in synchronization with said turntable, said disc means being effective to urge the bottle supplied by the automatic bottle supply conveyor into a receiving station prior to banding and to urge the bottle onto said take away conveyor subsequent to banding, said carrier means further comprising a fixed plastic support sheet over which the bottles are slid from the supply conveyor onto the turntable and from the turntable onto the take away conveyor.

* * * * *